United States Patent [19]

Chambers

[11] Patent Number: 4,992,993

[45] Date of Patent: Feb. 12, 1991

[54] CORRECTION FOR VARIABLE WATER-COLUMN VELOCITY IN SEISMIC DATA

[75] Inventor: Ronald E. Chambers, Houston, Tex.

[73] Assignee: Western Atlas International, Inc., Houston, Tex.

[21] Appl. No.: 539,239

[22] Filed: Jun. 18, 1990

[51] Int. Cl.⁵ .......................... G01V 1/22; G01V 1/38
[52] U.S. Cl. ..................................... 367/21; 367/902; 364/421
[58] Field of Search ............. 367/15, 21, 22, 125–127, 367/902; 364/421, 806, 150; 324/365

[56] References Cited

U.S. PATENT DOCUMENTS

| | | | |
|---|---|---|---|
| 3,274,608 | 9/1966 | Ewing et al. | 367/21 |
| 3,388,372 | 6/1968 | DeWitz | 367/120 |
| 4,319,347 | 3/1982 | Saint | 367/52 |
| 4,558,437 | 12/1985 | Meedes et al. | 367/15 |
| 4,577,297 | 3/1986 | Kalkomey et al. | 367/15 |
| 4,866,679 | 9/1989 | Chambers | 367/38 |

OTHER PUBLICATIONS

Lishman et al., "Approximating Subsurface Structure . . . Technique", Geophysics, vol. 54, #11, pp. 1397–1409, 11/89; abst. only provided.

Bryan et al., "Anisotropic Velocity Analysis for Lithology Discrimination", Geophysics, vol. 54, #12, pp. 1564–1574, 12/89; abst. only provided.

*Primary Examiner*—Nelson Moskowitz
*Attorney, Agent, or Firm*—William A. Knox

[57] ABSTRACT

In a marine seismic survey, a method for measuring the acoustic properties of the water mass at each seismic station along a line of survey by recovering acoustic reflections from discrete discontinuities within the water above the water-bottom reflection. A profile of the velocity distribution within the water column is calculated from a conventional velocity analysis.

7 Claims, 10 Drawing Sheets

CORRECTION FOR VARIABLE WATER-COLUMN VELOCITY IN SEISMIC DATA

BACKGROUND OF THE INVENTION

1. Field of the Invention

This is a method for correcting seismic travel times, gathered along a line of survey in a body of water such as the open ocean, to compensate for an irregular water bottom in the presence of spatial or temporal dynamic changes in the physical properties of the water mass.

2. Description of the Prior Art

Sea water has an acoustic velocity near the surface and within the mixed layer of around 1540 meters per second (m/s). Thereafter the acoustic velocity drops off to an average velocity through the water mass of about 1500 m/s. The acoustic velocity of the earth layers beneath the sea floor is on the order of 2000 to 3500 m/s depending upon the rock type.

Hereinafter in this application, the term "water velocity" will be used as a shorthand substitute for the expression "the velocity of an acoustic (sound) wave propagating through a body of water." The term "water velocity" does not mean the velocity of an elemental volume of water moving as part of an ocean current such as the Gulf Stream.

For good and sufficient reasons, marine seismic data are presented as time scale recordings along a line of survey in terms of two-way reflection travel times to sub-bottom earth layers vs lateral station separation. Variations in the thickness of an overlying layer between stations will introduce a false travel-time differential to the arrival times to layers below the overlying layer. So long as the velocity difference between layers is small, the false time anomaly will be small to insignificant. At sea, the water velocity is much less than the formation velocity. The effect of a rough water bottom is to distort the reflection travel times to the respective sub-bottom earth layers such that they approximately mirror a profile of the sea floor. One way to correct the reflection time data is by use of a layer replacement technique. The method is a type of static correction wherein the objective it to determine the reflection arrival times which would have been observed on a flat plane with no intervening low velocity material, i.e., water, present. Application of that method requires accurate knowledge of the water depth or thickness at each station which, in turn, requires an accurate knowledge of the water velocity.

In the past, it has been customary to compute the water thickness at each seismic station along the line of survey with a fathometer using a built-in assumed constant water velocity such as 1500 m/s or perhaps 5000 feet per second, depending upon the desired units of measurement. All subsequent seismic-data reduction computations were referred to that depth measurement.

The fallacy of the time-honored correction method at sea is the fact that the water velocity is not at all constant on an area-wide basis. It varies considerably not only laterally within a region but also time-wise due to shifting currents and eddies. For example, in the Gulf of Mexico, a velocity variation between summer and fall of 40 m/s at a depth of 500 meters was measured. As a consequence, intersecting seismic lines of survey shot at different times of year have experienced serious data misties amounting to as much as 12 to 20 milliseconds (ms) when corrections for a variable water depth were made using the aforementioned constant assumed average water velocity.

The water velocity is a function of salinity, density, pressure and temperature. It is known that the ocean water is distinctly stratified. Historically, the water velocity is calculated from information gleaned from bathythermograph and Nansen bottle casts which provide the data to solve an equation for the water velocity as a function of depth such as that shown in the *Encyclopedic Dictionary of Exploration Geophysics*, by R. E. Sheriff, page 270. The Bissett-Berman SVDT system has also been used to get a continuous velocity-temperature profile of the water mass. Oceanographic stations are generally several tens of miles apart. In making oceanographic casts, the instruments are secured to wire lines that may be many thousands of feet long. The oceanographic ship is obliged to linger one or more days on-station to make a single cast. The popularly-used assumed constant water velocity is simply a convenient round number derived from a world-wide average of data from sample points that are widely separated in space and time.

Heretofore, seismic exploration contractors, working close to shore, have been guilty of ignoring variations in the water velocity as a function of depth, location and time of year. So long as the water remained shallow and the water bottom remained relatively flat, no harm was done. As exploration moves into deeper water, on the order of thousands of feet, the matter of a laterally- and temporally-varying water velocity presents a serious problem. Certainly, a commercial geophysical exploration crew, which is expected to occupy hundreds of stations per day, cannot afford to make time-consuming oceanographic casts at each station.

Given a flat ocean bottom, the RMS velocity of the water mass can be calculated from the seismic data itself, that is from the ocean bottom reflections, through the medium of an $X^2-T^2$ analysis such as described at page 282 of Sheriff (op cit). However, that ideal situation of a flat bottom is the exception rather than the rule. In deep water, the sea floor is usually far too irregular to be used for a velocity study of the overlying water mass.

I have discovered that, with careful attention given to instrumentation and noise control in the field along with innovative data processing, I can observe and record reflections from discontinuities within the water mass itself. From those reflections, I can measure the acoustic properties of the water mass at each seismic station concurrently with the gathering of conventional seismic reflection data from the earth layers beneath the water bottom. I can do that by using weak data recorded during the time window between the shot instant and the arrival of the water-bottom reflection that others, skilled in the art, failed to recognize as being valid information and which they previously threw away as being interfering noise.

SUMMARY OF THE INVENTION

In accordance with an aspect of my invention, I teach a method for correcting erratic arrival times of seismic events reflected from earth layers beneath the sea floor, the erratic arrival times being due to water velocity variations and to a rough sea-floor topography. An acoustic wavefield is generated at a source point in the body of water. Reflections of the wavefield from discontinuities in the water mass are detected at one or more receiver points. The detected reflections are processed to derive a first model of the acoustic velocity distribution as a function of water thickness at the source and receiver points. Using the derived velocity, I compute the wavefield travel time through the first model. I form a second model of the body of water in terms of a preselected replacement velocity as a function of water thickness at the source and receiver points. Using that replacement velocity, I compute the wavefield travel time through the second model. The travel time differential between the two models is applied to the arrival times of the seismic events associated with the sub-bottom earth layers.

In accordance with another aspect of this invention, I calculate first and second hyperbolic moveout functions for the first and second models in terms of the offset distance between the source and receiver points. The time difference between the first and second hyperbolic moveout functions is measured and applied to the wavefield travel time of the second model to create a replacement time that is applied to the arrival times of the seismic events.

BRIEF DESCRIPTION OF THE DRAWINGS

These and other benefits of my invention will best be appreciated from the accompanying detailed description and the drawings wherein:

FIG. 2b is a time scale cross section derived from FIG. 2a;

DETAILED DESCRIPTION OF THE PREFERRED EMBODIMENT

Figure 1:
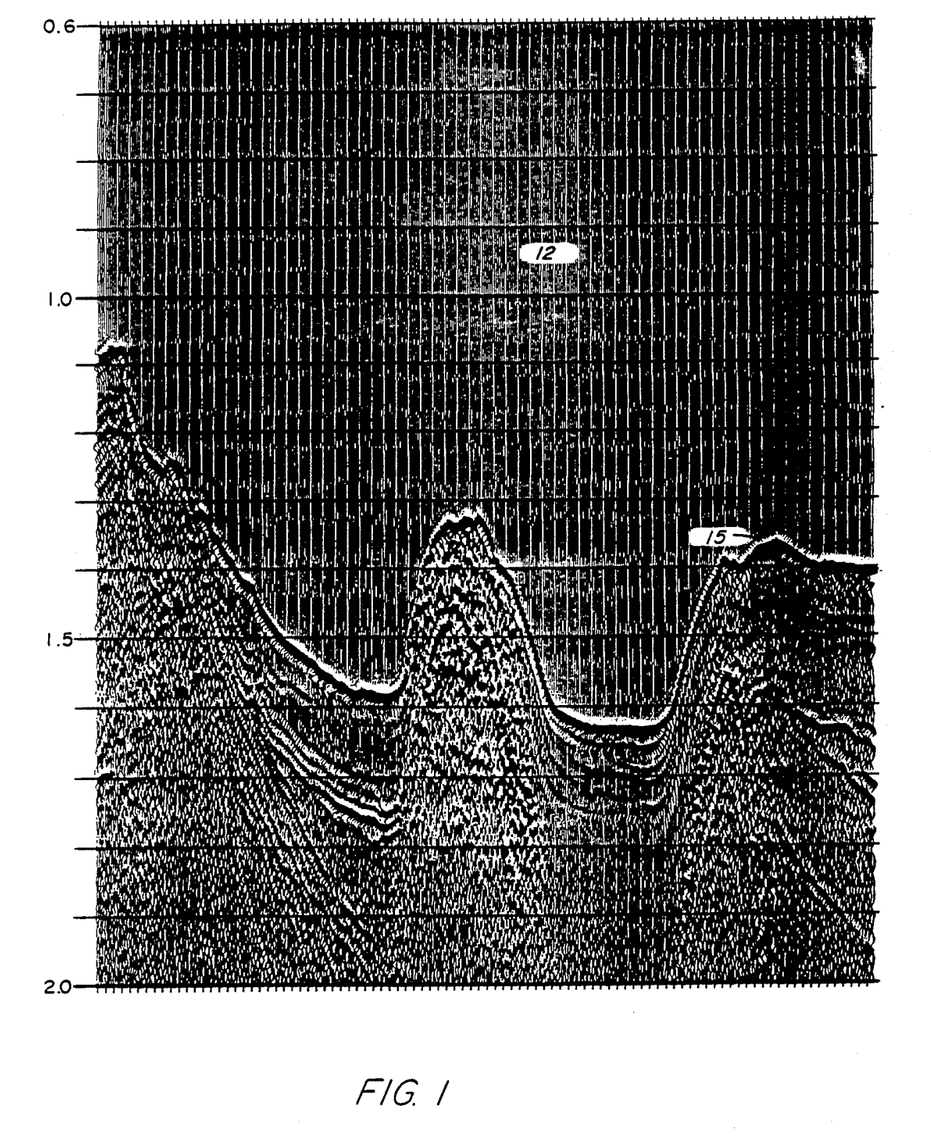
FIG. 1 is a portion of a deep-sea seismic time section.
Figure 2A:
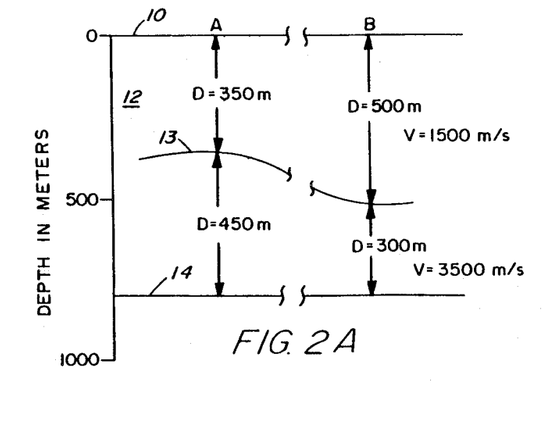
FIG. 2a is a schematic structural cross section of the sea floor and an underlying flat earth layer.
Figure 2B:
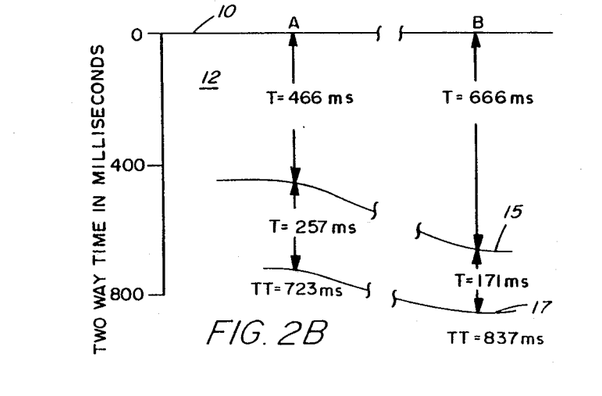
Figure 3:
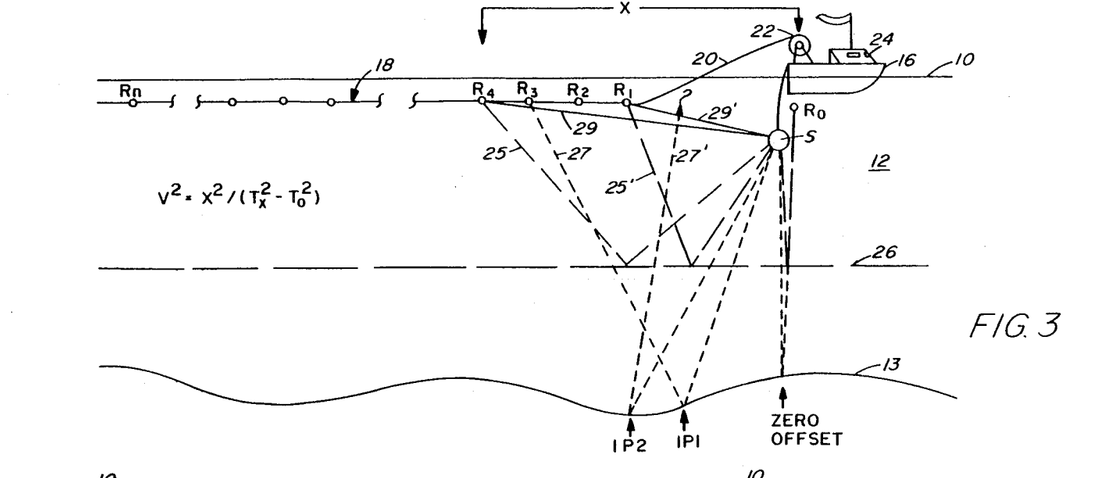
FIG. 3 shows the ray paths from a seismic source to seismic receivers, for reflections from a water-mass discontinuity and from an irregular water bottom.

The following paragraphs with respect to FIGS. 1-3 are tutorial for the benefit of the non-specialist.

FIG. 1 is a conventional reflection-time seismic section taken along a line of survey in a body of deep water in the Gulf of Mexico. The X axis is a function of lateral station separation. The Y axis is marked in terms of two-way reflection travel time. The ocean bottom, represented by bottom reflection 15 is quite rough. Reflections from deeper earth layers partially mirror the irregularities of the ocean bottom, giving the appearance of structural anomalies which may not necessarily be present. Observe that the seismic traces above the bottom reflection are relatively quiet except for some low-amplitude noise. Only a portion of the section from 0.6-2.0 seconds is shown. As stated earlier, the velocity of the water mass cannot be calculated using the ocean bottom reflection if it is sloping or rough.

The reason for the apparent distortion of sub-bottom reflections will now be explained with reference to FIGS. 2a and 2b. FIG. 2a is a schematic structural cross section of the sea floor and an underlying flat earth layer. Water mass 12 having a water surface 10 overlies a rough bottom 13. A flat-lying sub-bottom earth layer is represented at 14. Depths are shown in meters (m). A and B are the locations of seismic stations. The water depth at station A is 350 m and at B, it is 500 m. Earth layer 14 lies 800 m beneath the water surface 10. The water velocity is assumed to be 1500 m/s; the formation velocity is 3500 m/s.

FIG. 2b is a time-scale cross section synthesized from FIG. 2a. The vertical coordinate is two-way reflection travel time in milliseconds (ms) to the ocean bottom 13 and to the sub-bottom earth layer 14 of FIG. 2a that are now represented as reflection arrivals 15 and 17 respectively. The two-way travel time through the water mass 12, at station A is 466 ms assuming zero-offset data; the travel time between water-bottom reflection 15 and earth-layer reflection 17 is 257 ms for a total reflection travel time for reflection 17 of 723 ms. At station B, the respective travel times are 666 ms and 171 ms, for a total travel time of 837 ms at station B. The time section shows a false time differential of 114 ms between stations A and B for reflection 17 that approximately mirrors the profile of the sea floor.

The distortion can be corrected by use of the previously-mentioned layer replacement technique: The difference in water depths at stations A and B is multiplied by the reciprocal of the water velocity minus the reciprocal of the formation velocity thus:

$$150(\{1/1500\} - \{1/3500\}) = 114 \text{ ms.}$$

The time differential is applied to the raw travel times to get the desired corrected travel times.

The validity of the of the computations supra critically depends on use of the correct velocity through the water layer. Assume, for a moment, that stations A and B were occupied at different times of year and that between occupations, a vagrant eddy current flooded the region beneath station B. The water in the eddy current has an actual velocity of 1540 m/s instead of the assumed value of 1500 m/s. If the geophysicist persisted (which invariably had happened in the past) in mistakenly using a constant assumed velocity of 1500 m/s at both stations instead of the true velocity of 1540 m/s at station B, an error or mistie of 16 ms in the corrected two-way reflection travel time would have been committed. Such an error is intolerable in high-precision 3-D seismic surveys as will be shown later with respect to FIGS. 4 and 5.

FIG. 3 shows the ray paths associated with reflections from flat and irregular discontinuities. A seismic ship 16, sailing along the surface 10 of a body of water 12, tows a streamer cable 18 of any desired type through the water 12 from tow cable 20 that is secured to cable storage reel 22 mounted on the stern of the ship. Streamer cable 18 includes receivers or hydrophones that are positioned at receiver points R1, R2, R3, R4, . . . , Rn, along the cable. An acoustic-wave source S, such as an air gun array, is positioned at a source point behind the stern of ship 16. Instrumentation (not shown)

mounted inside cabin 24 provides means for periodically firing the source to generate an acoustic wavefield. Well-known means are furnished for recording reflections of the acoustic wavefield from discrete discontinuities in the water mass and from earth layers (not shown in FIG. 3) beneath the sea floor 13 that are detected by the receivers. In operation, as ship 16 moves along an assigned line of survey, the acoustic source S, is fired every 26.6 meters. The recorded data are then later assembled in multi-trace gathers centered about a zero offset trace as is well known to the art.

Assuming a substantially flat acoustic interface such as an exemplary water discontinuity 26, the RMS velocity in the material above the interface can be measured by means of an $X^2$-$T^2$ analysis as before mentioned. A discrete acoustic discontinuity 26, in the water mass 12, is shown in FIG. 3 as a dashed line; the discrete discontinuity could be due to different densities or to different salinities between two layers of water. A virtual zero-offset receiver is assumed to exist at Ro. The reflected ray paths from source S to receivers Ro, R1 and R4 are shown as slanted long-dashed lines 25 and 25'. The velocity is computed from the measured two-way reflection travel times to discontinuity 26 using the equation shown in the drawing. To is the two-way time to the zero-offset receiver Ro, Tx is the two-way reflected travel time to receiver R4 and X is the distance between Ro and R4. There should be no need to explain the theory of the geometrical construction further since that material is readily available from standard text books on geophysics.

Water discontinuity 26 is flat. The ray paths S-IP1-R1 and S-IP2-R4 are quite predictable and a velocity computation is valid. That is not so however for a sloping or rough interface such as sea floor 13. A ray path 27 (short dashes) from S to IP1 ends up at R3 instead of R1 because of the sloping surface of the sea floor at IP1. The ray path 27' from S that is incident upon the back slope of sea floor 13 at IP2 is back-scattered to some unpredictable position. Because of that unpredictable scattering, it is not usually possible to derive the water velocity from water bottom reflections from a rough bottom.

The water velocity near the surface can be determined from the water arrivals that follow direct paths 29 and 29' by measuring the time difference between two receivers that are a known distance apart.

In a reflection seismic survey, the matters of interest are reflection data from the sea floor and from the many earth layers beneath it. There is a time window between the source-firing instant and the time that desired reflected arrivals begin to appear. In deep water, the time window may be as much as one second long or more. The signals recorded during the time window are considered to be random noise. The noise is due to many sources, including the ship itself as well as other ships in the area, offshore rigs and the like. The noise signals were routinely blanked out as being useless interference.

Figure 4:
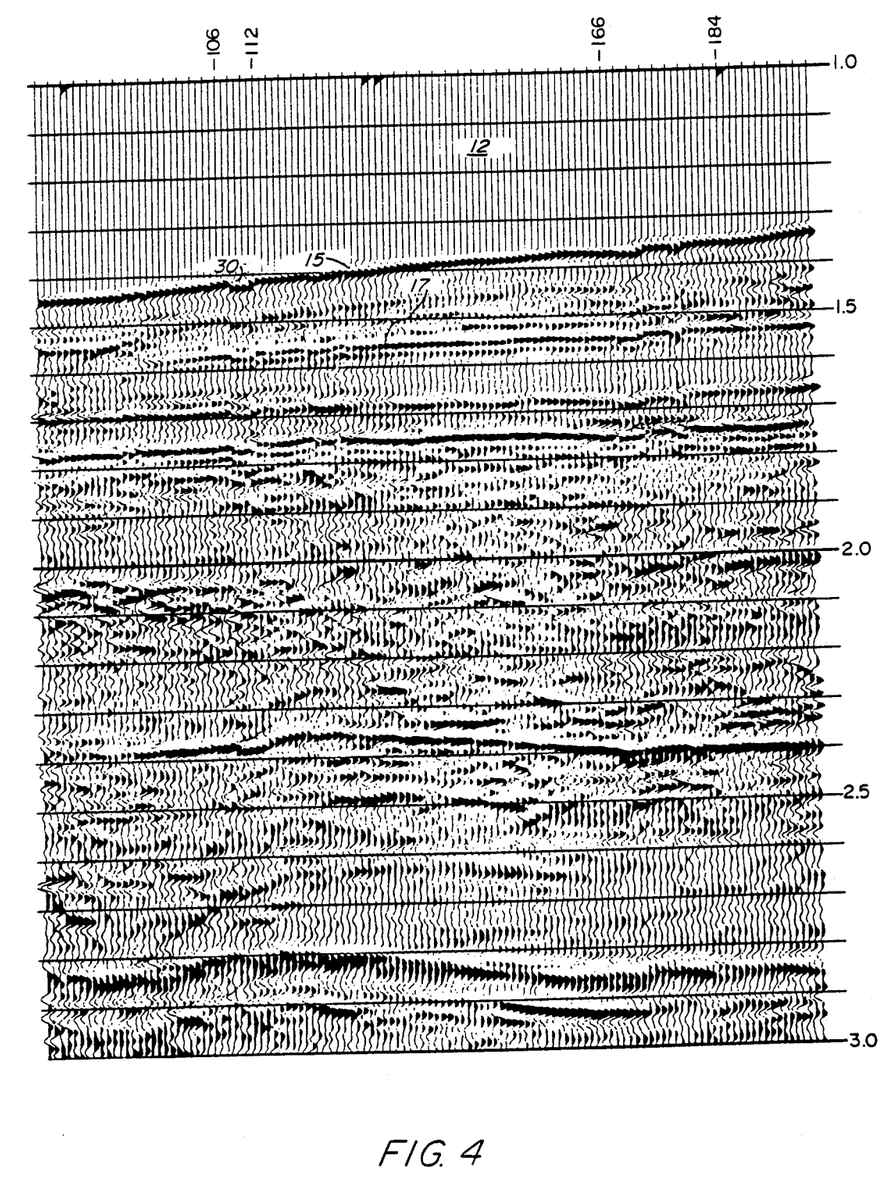
FIG. 4 is a portion of a seismic profile showing misties between seismic data gathered at different times of year.
Figure 5:
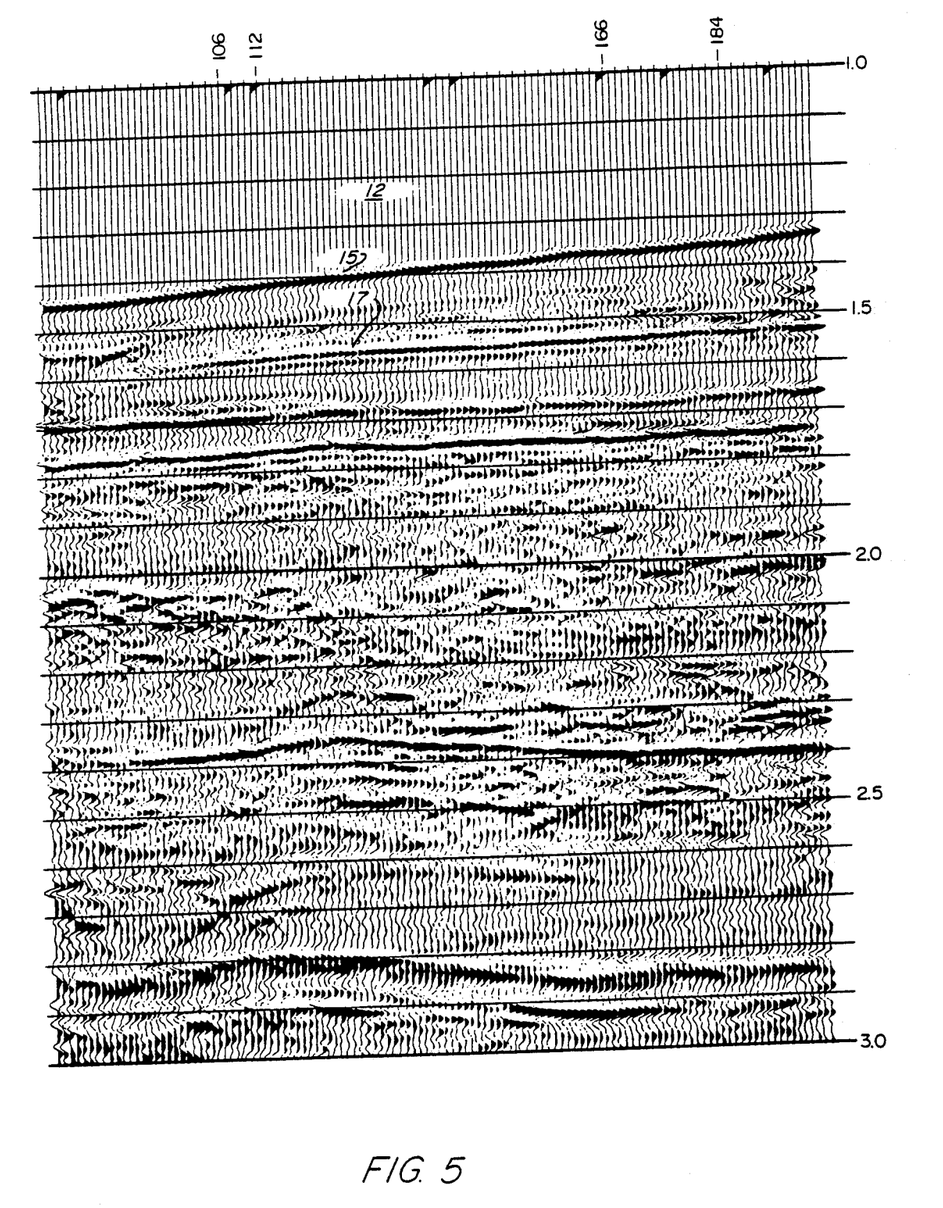
FIG. 5 is the section of FIG. 4 showing the misties corrected using the method taught herein.

As will be recalled from the discussion of FIG. 2b, use of an incorrect water velocity in the data reduction process, will result in a serious mistie. FIG. 4 is a portion of a seismic time section showing the water bottom reflection 15 and many sub-bottom reflections. As previously mentioned, the traces above the water bottom reflection 15 are blanked out or muted. The time window between the firing instant at time 0.0 (the upper 1.0 second of the section has been truncated to conserve space) and the bottom reflection 15 at about 1.4 seconds represents wavefield travel through the water mass 12. The survey line as originally shot had gaps at stations 106-112 and 164 to 184. The gaps were filled in two months later. Using traditional methods, the same assumed water velocity was used for data reduction in both campaigns. The mistie of about 12 ms at 30, for example, is obvious; sub-bottom reflections appear to be faulted.

I found that the water velocity had changed, for reasons unknown, between the original and the fill-in surveys. Using the methods to be discussed, I recomputed the data-reduction calculations to produce the seismic section of FIG. 5 wherein the continuity of the reflection data has been restored.

I have discovered that weak intra-water-mass reflection events are embedded in the noise above the water bottom reflection. The amplitude level of the water-mass reflections may be 60 dB (1000:1) below the amplitude level of the noise. By careful attention to noise abatement, such as by use of a resilient tow cable 20, and by judicious application of AGC and well-known multifold stacking techniques, I have been able to recover the weak water mass reflection data and to put them to use. That is something that has never previously been done in the seismic industry to my knowledge.

Figure 6:
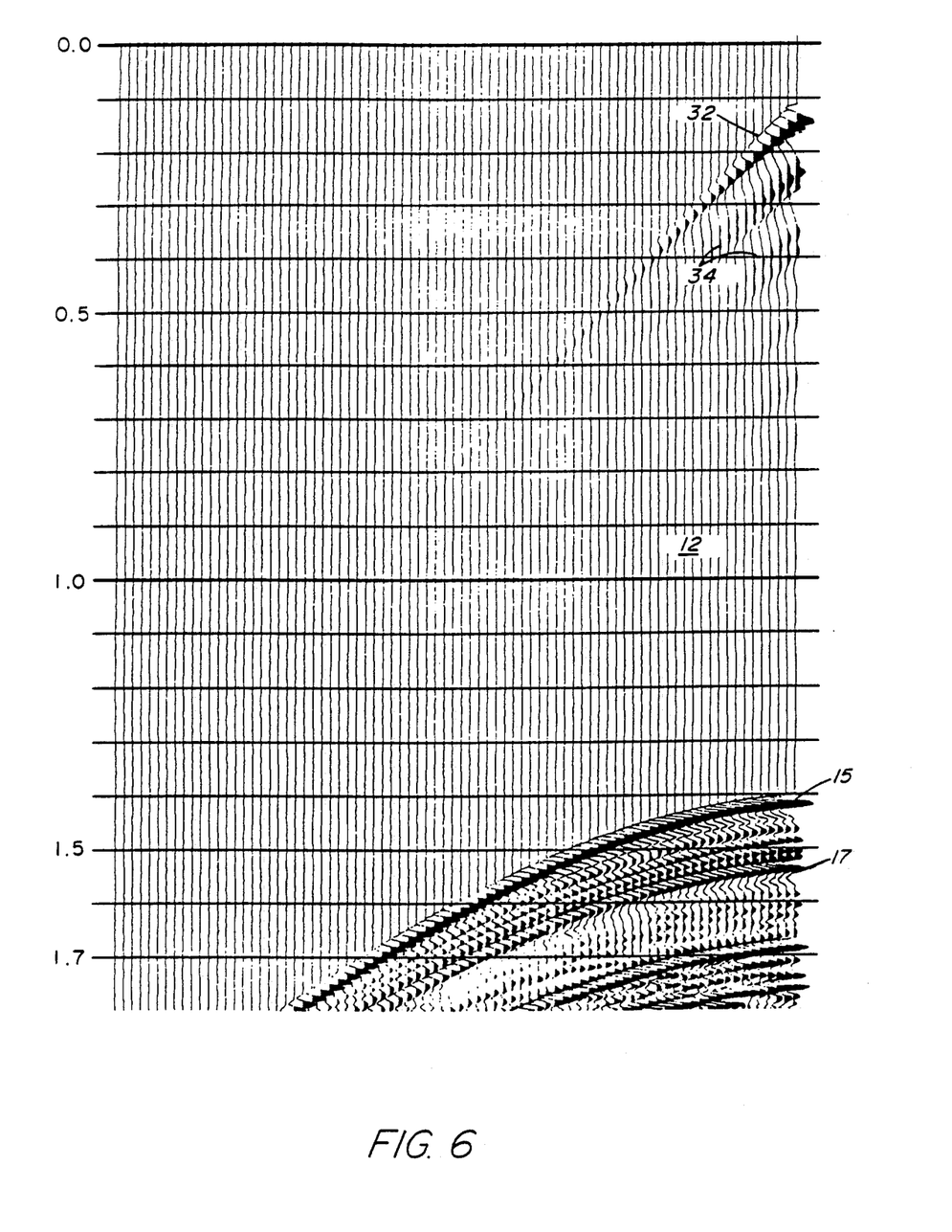
FIG. 6 is a portion of a common shot-point gather.

Recovery of the intra water-mass reflections requires innovative processing techniques not previously attempted. FIG. 6 is a portion of a common shot point gather centered at station 181, from an area near that of FIG. 5. The time window between firing of an acoustic source at time 0.0 and the arrival of the water bottom reflection 15 at a two-way reflection time of about 1.410 seconds represents travel time through a water mass such as 12 of FIG. 3. We see the direct arrival events 32 that are rapidly attenuated with increasing distance from the source. The direct arrivals are followed by several noise bursts 34 of unknown origin. In keeping with conventional practice, the traces are customarily muted ahead of the water bottom reflection as shown in the previous figures because events 32 and 34 are considered to be useless.

Figure 7:
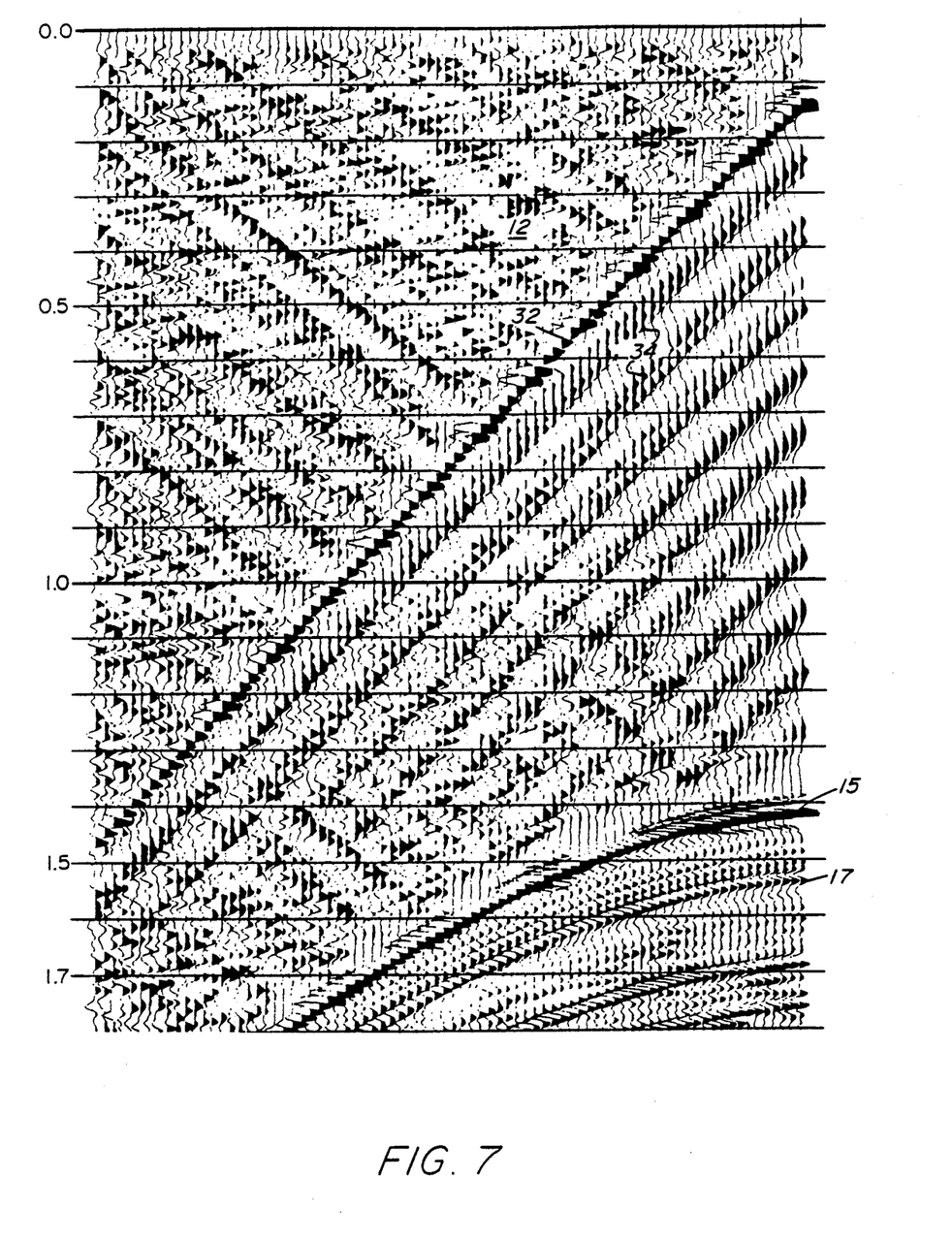
FIG. 7 is the common shot-point gather of FIG. 6 with a gain function applied.

In FIG. 7, I have applied a gain function within the water-mass time window in an attempt to see intra water-mass reflections which, if present, were believed to be very weak. The direct arrivals 32 and the random noise are overpowering. All of the linear alignments are noise of undetermined source. A very weak reflection appears at 1.3 seconds. It is identifiable as a reflection because of its hyperbolic curvature.

Figure 8:
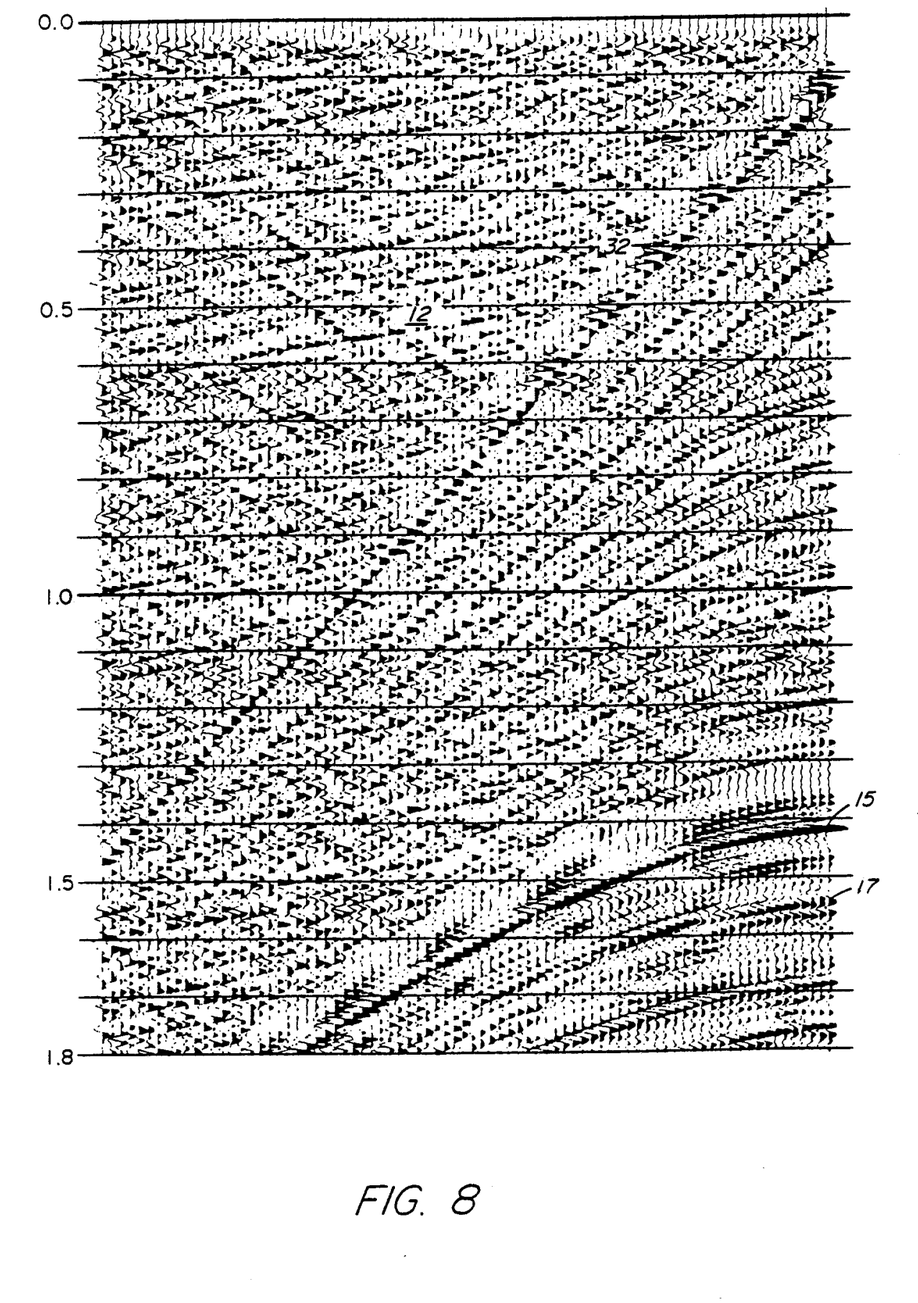
FIG. 8 is the common shot-point gather of FIG. 7 after spectral amplitude balancing.

In FIG. 8, I have spectrally amplitude-balanced the data of FIG. 7, over a limited portion of the seismic spectrum. The very low frequencies have been filtered out. The amplitude of the higher frequencies up to about 80 Hz have been equalized to match the amplitudes of the lower frequencies down to about 6 Hz. A number of valid reflections now stand out between time 0.0 and the water bottom reflection 15 at 1.410 seconds. Four reflections at 0.670, 0.775, 0.875 and 0.940 second are prominent. The reflections have hyperbolic curvature and would become asymptotic the the direct water arrivals if they could be followed that far. The noise arrivals are linear alignments.

Figure 9:
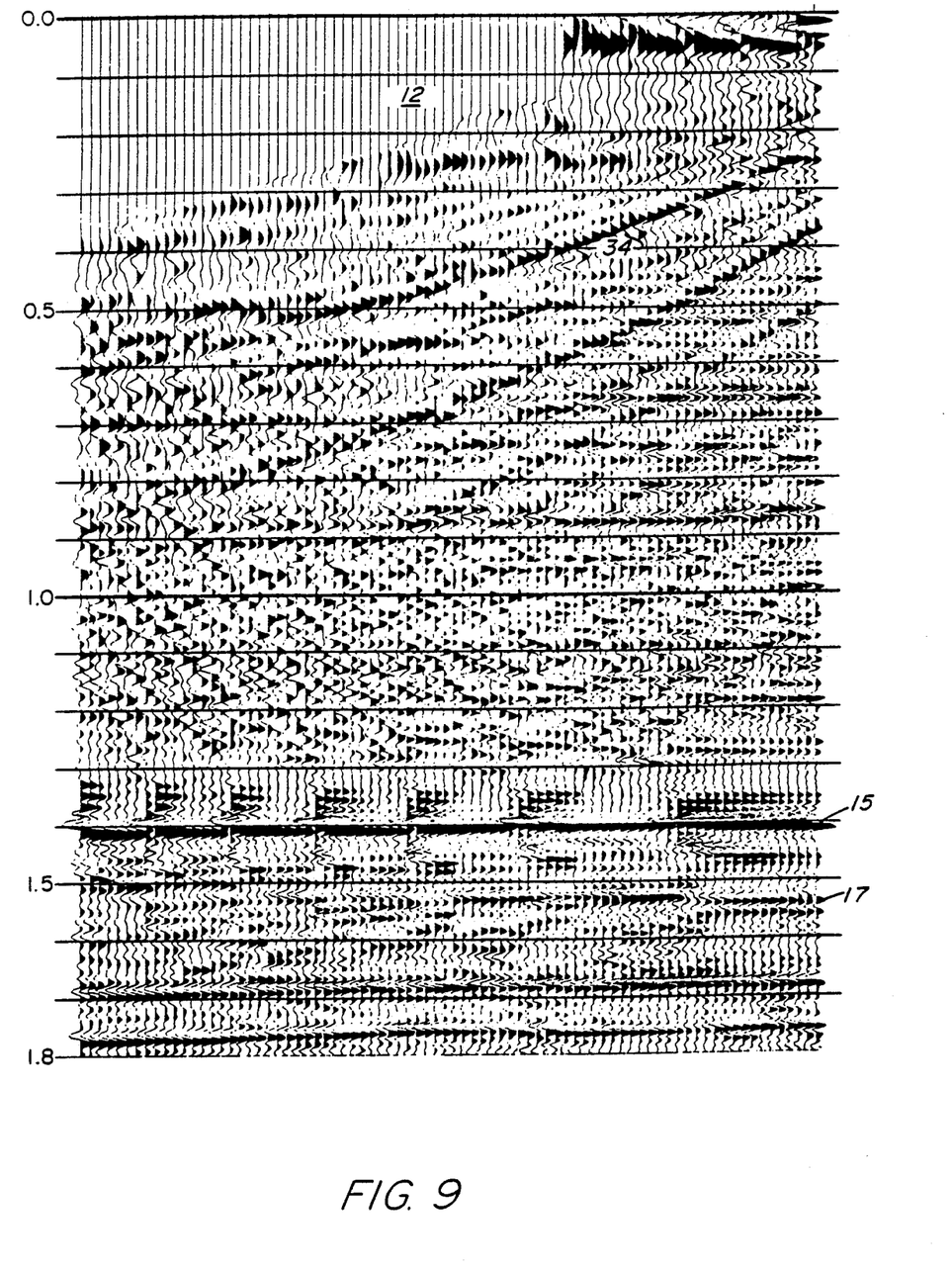
FIG. 9 is the common shot-point gather of FIG. 8 after application of hyperbolic moveout correction, showing reflections from within the water mass.

In FIG. 9, I have applied a hyperbolic moveout correction to the water reflections, based upon the RMS water velocities, to produce a time section that clearly exhibits discrete discontinuities in the water mass 12 above the ocean bottom reflection 15. The RMS velocity derived from the water mass reflections at each common shot-point gather is used to calculate the true water depth at that shot point. By using the RMS velocity as derived at each station, the misties shown in FIG. 4 were reconciled to produce the corrected section of FIG. 5.

Figure 10:
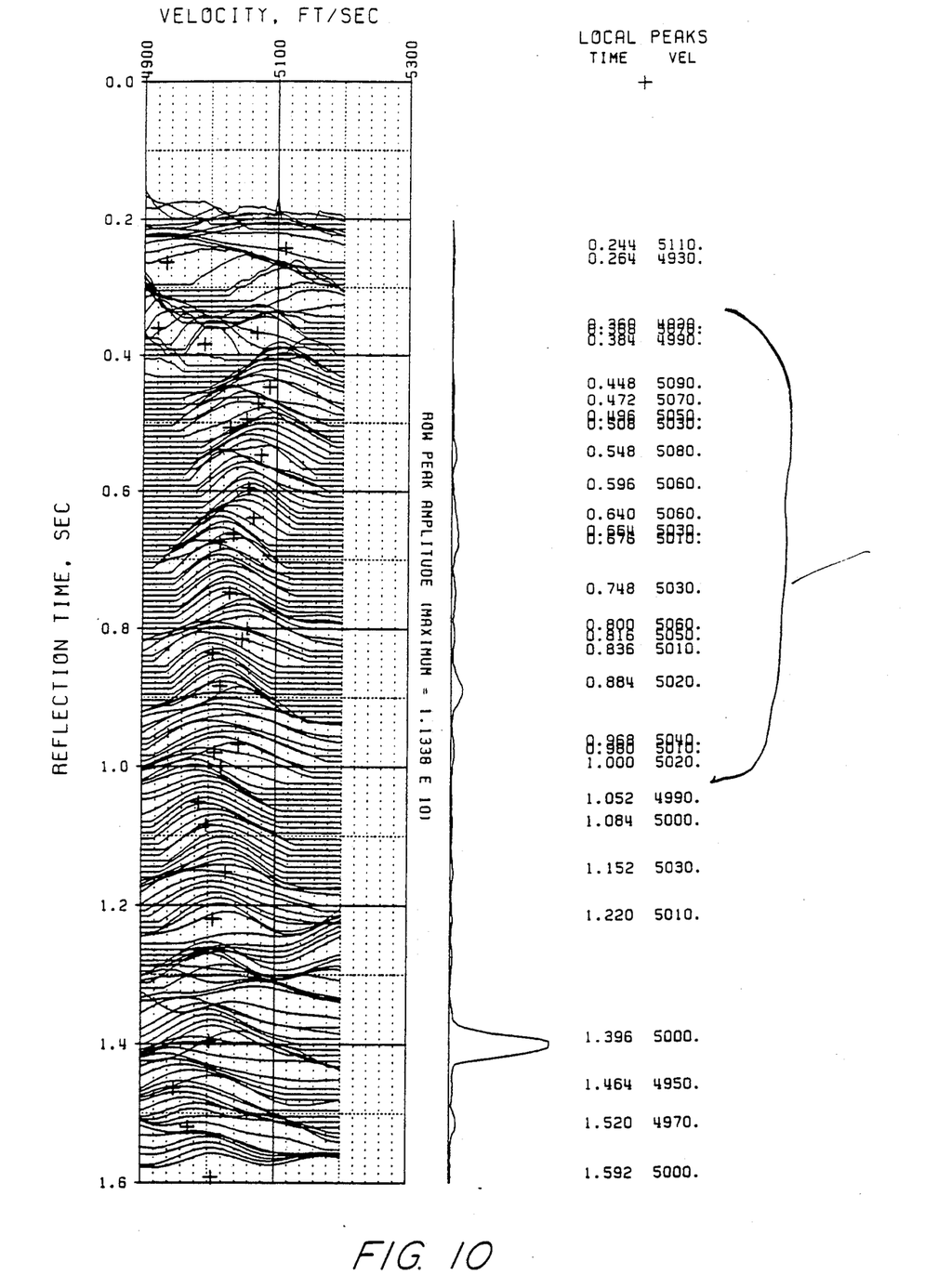
FIG. 10 is a velocity analysis derived from reflections from discontinuities within the water mass in the area of the mistie of FIG. 4 during a first survey.

In FIG. 10, I exhibit a velocity analysis profile derived from reflections from within the water mass in the area of the mistie 30 of FIG. 4 that was shot during the original seismic survey.

Figure 11:
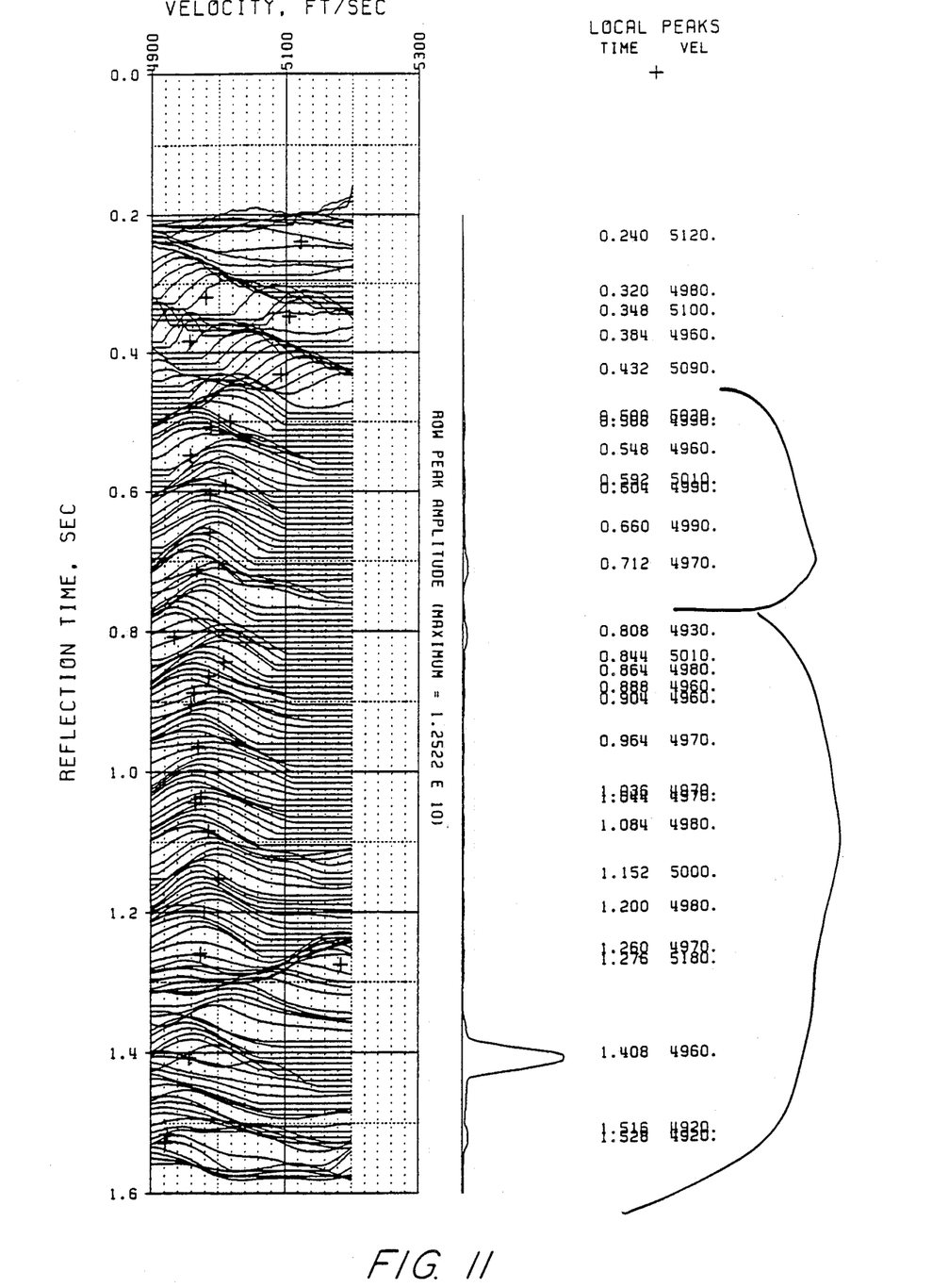
FIG. 11 is a velocity analysis taken from data at the mistie during a fill-in survey.

FIG. 11 is a velocity analysis profile obtained from seismic data acquired during the fill-in survey. An RMS velocity difference of 40 feet per second at the base of the water column is indicated which accounts for the 12 ms mistie observed in FIG. 4 using conventional methods.

I have thus provided a method for determining the actual water velocity at each seismic station in conjunction with conventional seismic profiling.

In a preferred mode of operation, at each seismic station, a sound source is fired to generate a wavefield in a body of water. Reflections of the acoustic wave field from discrete discontinuities in the water mass as well as reflections from the water bottom and sub-bottom earth layers are received by a plurality of receivers offset at desired increments of distance from the source. A gain function is applied to the weak seismic arrivals in the time window between the firing time of the source and the arrival time of the water bottom reflection. The gain-processed data are spectrally amplitude balanced to recover reflected wavefields from discrete discontinuities within a water mass. By means of a velocity analysis of any well-known type, the RMS water velocity is determined from the water mass reflection data at each seismic station. Using that velocity, a first model of the body of water is derived in terms of water thickness at the source and receiver points. The reflection travel time through the first model is computed. Using a preselected replacement velocity, a second travel-time model through the water mass is formed as a function of water thickness. The travel time differential between the two models is applied to the the arrival times of the seismic events associated with the bottom and sub-bottom layers. A first hyperbolic moveout function is calculated for the first model in terms of the RMS velocity as determined above and the offset distance to the respective receivers. A second hyperbolic moveout function is calculated for the second model in terms of the predetermined replacement velocity and offset distance. The time difference between the first and second hyperbolic moveout functions is measured and is applied to the reflection travel times of the second model.

Those skilled in the art will recognize that any number of different techniques may be used to accomplish the objective of my invention which is limited only by the appended claims.

I claim as my invention:

1. In conjunction with a marine seismic survey, a method for correcting erratic arrival times of seismic events associated with earth layers beneath a body of water due to a rough water bottom and variations in the water velocity, comprising:
    generating an acoustic wave field in a body of water at a source point;
    at a receiver point, offset from said source point by a preselected distance, detecting reflections of said acoustic wave field from discrete discontinuities within said body of water;
    using said detected reflections, calculating the RMS velocity as a function of water thickness at said source and receiver points and using said calculated RMS velocity, computing the wavefield travel time through said body of water to derive a first model of said body of water;
    forming a second model of said body of water in terms of a preselected average replacement velocity as a function of water thickness at said source and receiver points and using said replacement velocity, computing the wavefield travel time through said second model;
    calculating the travel-time differential between said first and second models and applying said travel-time differential to the arrival times of the seismic events associated with said earth layers.

2. The method as defined by claim 1, wherein the step of calculating comprises the step of:
    calculating first and second hyperbolic moveout time functions for said first and second models respectively in terms of the offset distance between said source and receiver points;
    measuring the time differential between said first and second hyperbolic moveout time functions;
    associating the measured time differential with the wavefield travel time of said second model to create a replacement time; and
    applying said replacement time to the arrival times of the seismic events associated with said earth layers.

3. The method as defined by claim 1, and repeating the steps of generating, detecting, deriving, forming and applying at a plurality of source points and at a plurality of receiver points along a line of survey.

4. The method as defined by claim 1, wherein said source and receiver points are co-located with the source and receiver points used for reflection profiling of said earth layers.

5. A method for modeling an RMS velocity profile of a water mass for use in data reduction, based upon data gathered from a moving seismic ship, comprising:
    establishing a source point;
    establishing a plurality of receiver points;
    generating an acoustic wave field by firing an acoustic source at said source point;
    at each receiver point, receiving and recording a water bottom reflection arrival and seismic signals originating from within said water mass;
    defining a time window between the firing instant of said source and the reception of said water bottom reflection arrival;
    within said time window, gain conditioning the seismic signals originating from within said water mass by applying thereto an AGC function having preselected characteristics;
    spectrally amplitude balancing said gain conditioned seismic signals to reveal intra-water-mass reflection data signals;
    processing said revealed intra-water-mass reflection data signals to derive the RMS velocity of said water mass; and
    displaying said revealed intra-water-mass reflection data signals as a continuous profile.

6. The method as defined by claim 5, wherein: said receiver points are substantially linearly disposed with respect to said source point.

7. The method as defined by claim 5 comprising: concurrently recording acoustic reflections from earth layers beneath the water bottom.

* * * * *